United States Patent
Vincent et al.

(10) Patent No.: US 11,232,236 B2
(45) Date of Patent: Jan. 25, 2022

(54) DYNAMIC RESPONSE OF POWER DELIVERY NETWORK FOR ATTESTATION AND IDENTIFICATION

(71) Applicant: Arm Limited, Cambridge (GB)

(72) Inventors: Hugo John Martin Vincent, Cambridge (GB); Shidhartha Das, Upper Cambourne (GB); Milosch Meriac, Cambridge (GB); Vasileios Tenentes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/048,521

(22) PCT Filed: Apr. 18, 2019

(86) PCT No.: PCT/EP2019/060059
§ 371 (c)(1),
(2) Date: Oct. 16, 2020

(87) PCT Pub. No.: WO2019/202065
PCT Pub. Date: Oct. 24, 2019

(65) Prior Publication Data
US 2021/0064789 A1    Mar. 4, 2021

(30) Foreign Application Priority Data

Apr. 20, 2018 (EP) .................................. 18386008
Jun. 13, 2018 (EP) .................................. 18386016
Apr. 11, 2019 (EP) .................................. 19386023

(51) Int. Cl.
*H04L 29/06* (2006.01)
*G06F 21/75* (2013.01)
(Continued)

(52) U.S. Cl.
CPC ....... *G06F 21/755* (2017.08); *G01R 19/0053* (2013.01); *G01R 19/16585* (2013.01);
(Continued)

(58) Field of Classification Search
None
See application file for complete search history.

(56) References Cited

U.S. PATENT DOCUMENTS 9,268,938 B1    2/2016   Gonzalez et al.
9,659,423 B2 *  5/2017   Robertson ............ A61B 5/0028
(Continued)

FOREIGN PATENT DOCUMENTS

EP    2571131 A1    1/2018
EP    3086255 A1    9/2018

OTHER PUBLICATIONS

P. N. Whatmough, S. Das, Z. Hadjilambrou and D. M. Bull, "Power Integrity Analysis of a 28 nm Dual-Core ARM Cortex-A57 Cluster Using an All-Digital Power Delivery Monitor," in IEEE Journal of Solid-State Circuits, vol. 52, No. 6, pp. 1643-1654, Jun. 2017, doi: 10.1109/JSSC.2017.2669025.
(Continued)

*Primary Examiner* — Maung T Lwin
(74) *Attorney, Agent, or Firm* — Leveque Intellectual Property Law, PC

(57) ABSTRACT

A method and authenticator for authenticating a device in a system using the electrical properties of the device is disclosed. Embodiments of the disclosure enable authentication by receiving a plurality of input seed values from a requestor. For each input seed value, load stimuli are generated to produce an electrical load sequence on a power delivery network powering at least part of the system. Noise induced in the power delivery network is measured in response to the electrical load sequence using one or more
(Continued)

sensors located on the power delivery network. Based on the measured noise, a dynamic response property (magnitude and phase response as a function of frequency) of the power delivery network corresponding to a respective input seed value can be determined and returned to the requestor.

14 Claims, 8 Drawing Sheets

(51) Int. Cl.
    *G01R 19/165* (2006.01)
    *G01R 31/08* (2020.01)
    *G06F 1/28* (2006.01)
    *G06F 21/44* (2013.01)
    *H04L 9/00* (2006.01)
    *H04L 9/08* (2006.01)
    *H04L 9/32* (2006.01)
    *G01R 19/00* (2006.01)
    *G01R 29/26* (2006.01)

(52) U.S. Cl.
    CPC ........... *G01R 29/26* (2013.01); *G01R 31/086* (2013.01); *G01R 31/088* (2013.01); *G06F 1/28* (2013.01); *G06F 21/44* (2013.01); *H04L 9/003* (2013.01); *H04L 9/085* (2013.01); *H04L 9/3242* (2013.01); *H04L 9/3265* (2013.01)

(56) References Cited

U.S. PATENT DOCUMENTS

| | | |
|---|---|---|
| 2007/0164754 A1 | 7/2007 | Smith et al. |
| 2014/0068272 A1* | 3/2014 | Savtchenko .......... H04L 9/3226 713/185 |
| 2014/0359550 A1 | 12/2014 | Ding et al. |
| 2015/0137864 A1 | 5/2015 | Whatmough et al. |
| 2015/0195082 A1 | 7/2015 | Han et al. |
| 2017/0030954 A1 | 2/2017 | Whatmough et al. |

OTHER PUBLICATIONS

Sehatbakhsh N, Hong H, Lazar B, et al. Syndrome: spectral analysis for anomaly detection on medical IoT and embedded devices-experimental demonstration. Paper presented at: Proceedings of the Hardware Demo at IEEE International Symposium on Hardware Oriented Security and Trust (HOST 2018); 2018.

European Patent Office, International Search Report and Written Opinion, PCT/EP2019/060059, dated Jul. 22, 2020.

* cited by examiner

DYNAMIC RESPONSE OF POWER DELIVERY NETWORK FOR ATTESTATION AND IDENTIFICATION

The present disclosure relates generally to hardware security, and more particularly, to remote detection and mitigation of attempted non-invasive, semi-invasive, or invasive tampering to a power delivery network.

Various attacks on hardware pose an ever-increasing risk to security. One such attack is differential power analysis, where oscilloscope probes are attached to power supply rails on a printed circuit board (PCB) containing the victim system-on-chip (SoC). In this attack, power supply decoupling capacitors are commonly removed to increase the signal to noise ratio and/or frequency content of the power side channel leakage. Another such attack is referred to as a fault injection attack, where a signal generator probe is attached to the power rail (or AC coupled via any other package pin(s)) as a precursor to injecting faults.

Further attacks might involve adding additional circuitry on PCB level/mainboard level to circumvent security features or for backdooring devices—examples of such devices have been mod-chips on contemporary gaming consoles, backdooring devices for server mainboards or sniffer-devices added to Point-of Sales terminals (PoS) to intercept and relay credit card information to remote attackers. Most of these circuits draw power from existing power sources inside the device—and changing the dynamic response of the existing power circuitry as a result. It's important to highlight that this influence can be visible even across voltage regulator boundaries—albeit at a usually worse signal-response ratio. This means for example that a processor might observe unexpected loads on an upstream voltage rail across a voltage regulator (LDO) boundary—at the cost of power supply ripple rejection (PSSR)—that can be commonly in the range of 40-70 dB. This extends the reach of the present disclosure beyond the immediately accessible power network and might allow peeking into related power network (connected by linear regulators, DC/DC converters and similar means).

It would therefore be desirable to provide a novel apparatus and methodology for remote attestation of the SoC to detect, if and when probes or malicious circuitry have been attached or other affordances made, even before a fault is injected, a backdoor opened, an internal information leaked or a side channel analysis conducted.

The present disclosure is illustrated by way of example and not limited in the accompanying figures in which like reference numerals indicate similar elements and in which.

Figure 1:
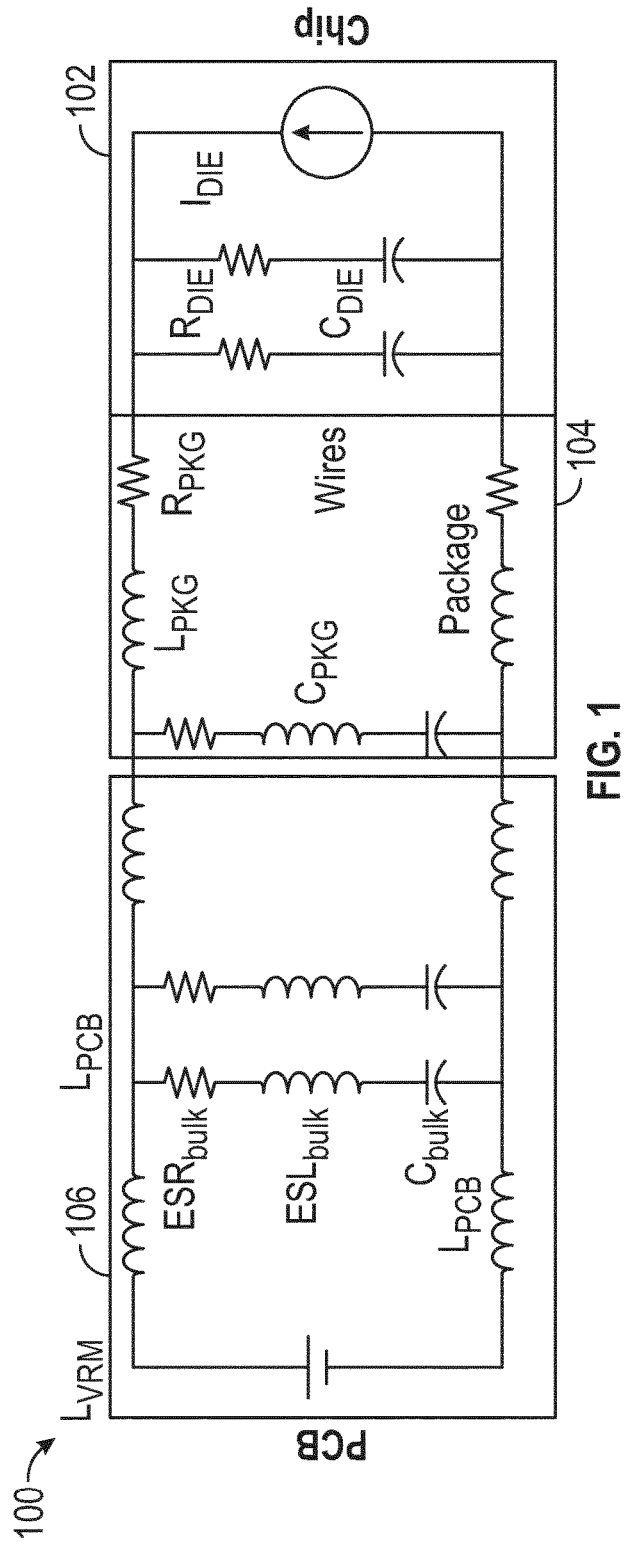
FIG. 1 is a high-level schematic diagram of an example shared power-delivery network (PDN)

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure, and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

In accordance with an embodiment of the present disclosure, there is provided a method for authenticating a device in a system using electrical properties in the system. The method includes: receiving, from a requestor, a plurality of input seed values; generating, for each input seed value, load stimuli to generate an electrical load sequence on a power delivery network powering at least part of the system, each electrical load sequence relating to at least one magnitude and phase component in a specific frequency band corresponding to a dynamic response of the system; measuring, using one or more sensors located on the power delivery network, noise induced in the power delivery network in response to the electrical load sequence; determining, based on the measured noise, a dynamic response property of the power delivery network corresponding to a respective input seed value; generating, from the dynamic response property of the power delivery network a plurality of authentication response values, each authentication response value relating to at least one magnitude and phase component in a specific frequency band corresponding to the measured dynamic response property; returning the authentication response values to the requestor; and at the requestor, comparing the authentication response values to known authentication response values to authenticate the device.

In accordance with another embodiment, there is provided an authenticator for authenticating a device in a system using electrical properties in the system. The authenticator includes: a processor operable to: receive, from a requestor, a plurality of input seed values; generate, for each input seed value, load stimuli for generating an electrical load sequence on a power delivery network powering at least part of the system, each electrical load sequence relating to at least one magnitude and phase component in a specific frequency band corresponding to a dynamic response of the system; receive data representing noise induced in the power delivery network in response to the electrical load sequence measured using one or more sensors located on the power delivery network; determine, based on the measured noise, a dynamic response property of the power delivery network corresponding to a respective input seed value; generate, from the dynamic response property of the power delivery network a plurality of authentication response values, each authentication response value relating to at least one magnitude and phase component in a specific frequency band corresponding to the measured dynamic response property; and return the dynamic response property of the power delivery network to the requestor, the requestor operable to compare the authentication response values to known authentication response values to authenticate the device.

Referring to FIG. 1, there is depicted a high-level schematic diagram of an example power-delivery network (PDN) 100 composed of a die-package-printed circuit board (PCB) system. Such a die-package-printed circuit board is disclosed in S. Das, P. Whatmough, and D. Bull, "Modeling and characterization of the system-level power delivery network for a dual-core arm cortex-a57 cluster in 28 nm cmos," in 2015 IEEE/ACM International Symp. on Low Power Electronics and Design (ISLPED), July 2015, the content of which is incorporated by reference herein in its entirety. The die-package-PCB system is generally depicted and includes a die (chip) 102, package 104 and PCB 106. A plurality of die switching transistors on the die are lumped together and modeled as a current source, Idle. Explicit on-die decoupling capacitors and non-switching transistors act as local charge reservoirs that are modeled by a capacitor, $C_{die}$. The power-line traces on the package and board are represented using R-L networks. Discrete decoupling capacitors (referred to as decaps) on the package ($C_{PKG}$) and the bulk capacitors on the PCB ($C_{BULK}$) are modeled by capacitors in series with their effective series resistance (ESR) and inductance (ESL). Eqn. (1) represents an analytic solution for the voltage droop seen at the die supply rails for such a simplified model of the PDN:

$$\Delta V_{die}(t) \cong 2I_{max} \ R + I_{max} \sqrt{\frac{2L_{pkg}}{C_{die}}} \cdot e^{-\frac{R}{2L_{pkg}}t} \sin(\omega_r - \theta) \quad \text{Eqn. 1}$$

The voltage droop can be decomposed into a DC IR-drop term and an AC Ldi/dt term. The resistive component of the droop is addressed by increasing the metallization resources in the PDN 100. The inductive component is a trade-off between the package and the die and far exceeds the resistive droop magnitude in modern computing systems.

Figure 2:
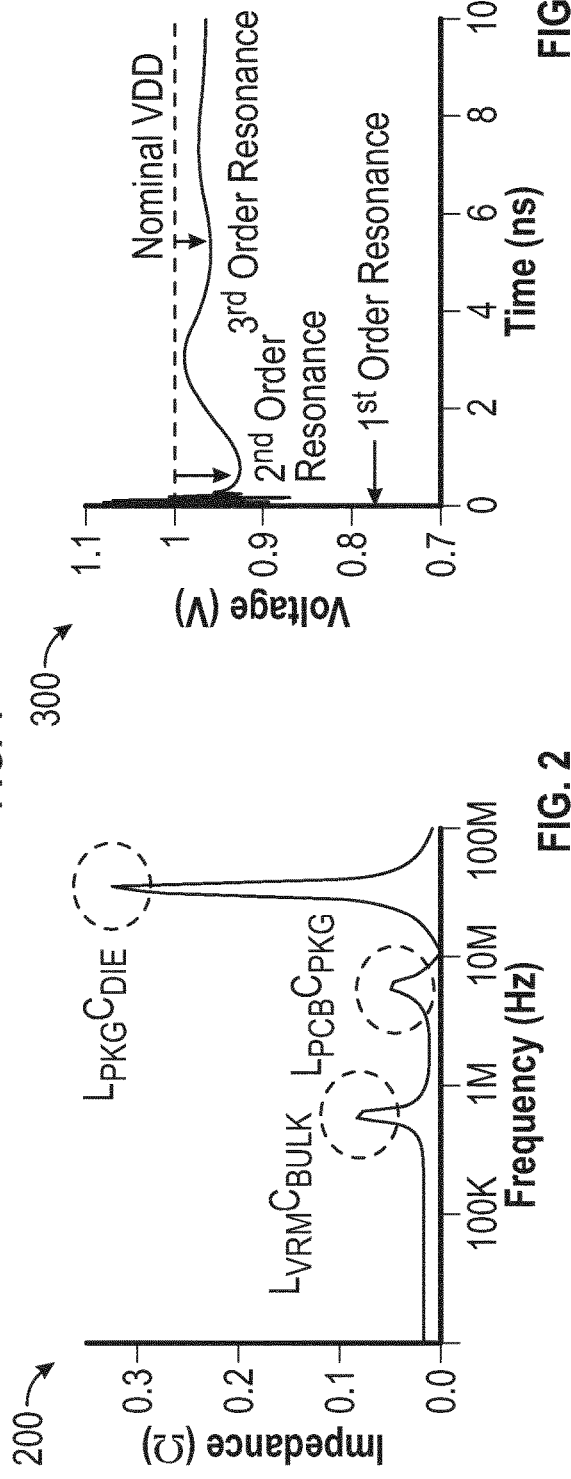
FIG. 2 is a graph of the PDN input impedance (as seen from the die), as a function of frequency for the simplified PDN of FIG. 1.

Referring now to FIG. 2, there is depicted a graph 200 of the PDN input impedance (as seen from the die) as a function of frequency for the simplified PDN 100 illustrated in FIG. 1. The impedance spectrum shows three distinct impedance peaks attributable to each capacitor resonating with its counterpart inductor. The highest impedance peak, referred to as the "first-order resonance," also occurs at the highest frequency (~100 MHz) and is due to the resonance between the die capacitance and the package inductance. The second-and third-order resonances are due to downstream capacitor networks, and occur at relatively lower frequencies (~1 MHz and ~10 KHz for the $2^{nd}$ and $3^{rd}$-order resonances, respectively).

Figure 3:
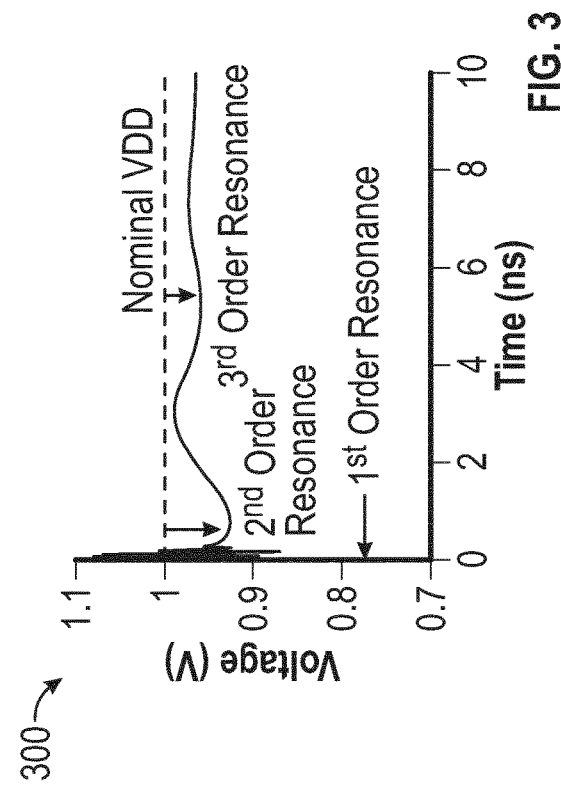
FIG. 3 is a graph of current-step excitations that exercise the three prominent system resonance frequencies in the PDN.

With reference to FIG. 3, there is shown a graph 300 of current-step excitations that exercise the three prominent system resonance frequencies in the PDN 100 due to microarchitectural events such as pipeline interlocks. The maximum magnitude of the voltage droop is caused due to the first-order resonance, which as such dominates the total timing margin.

Figure 4:
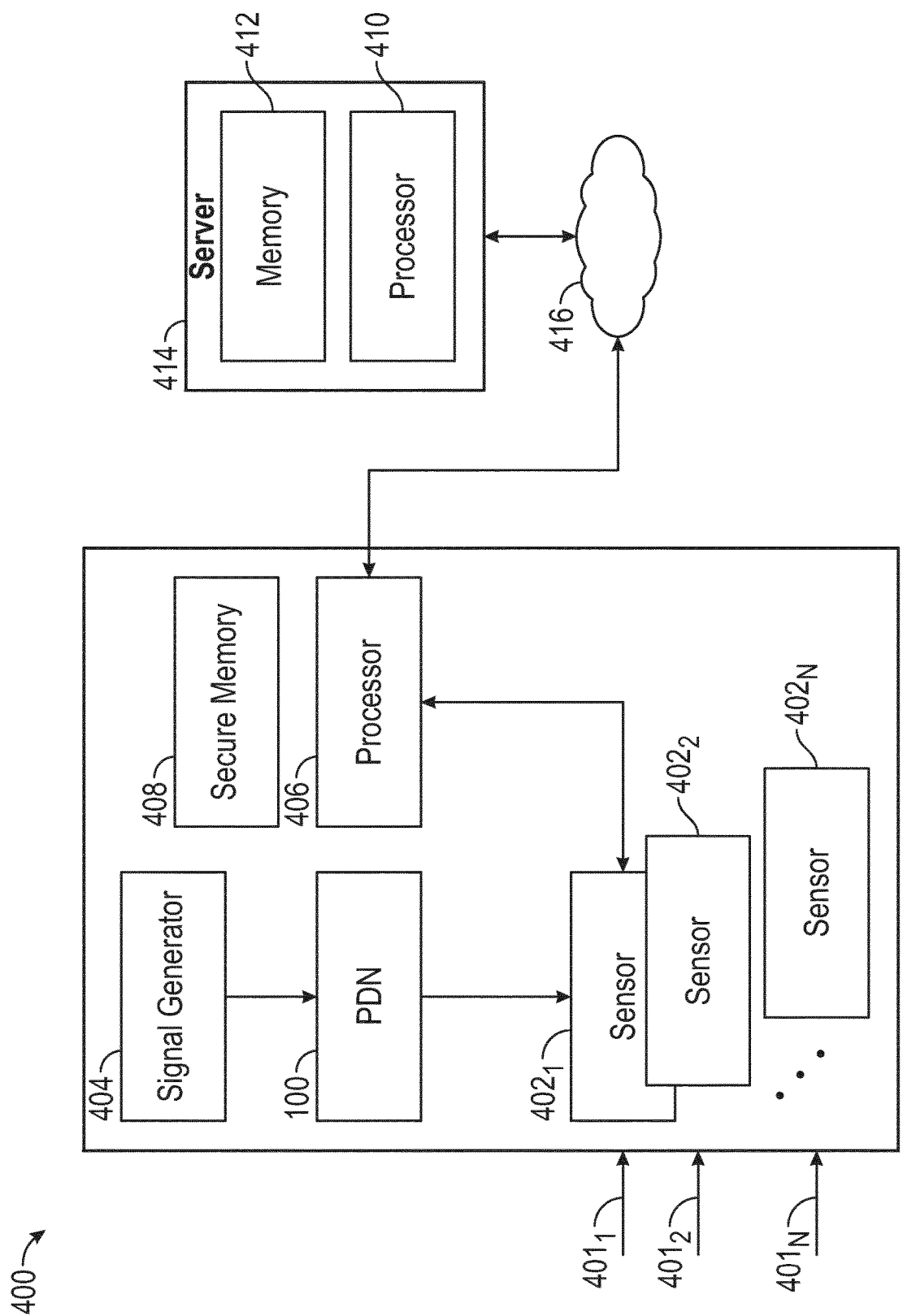
FIG. 4 is a high-level block diagram of an example embodiment in accordance with the present disclosure.

Referring now to FIG. 4, there is depicted a high-level block diagram of an example embodiment 400 in accordance with the present disclosure. One $402_1$ or more ($402_2 \ldots 402_N$) on-chip power supply rail noise monitoring sensors are coupled to PDN 100. The power delivery network might include networks across power supply boundaries, LDOs, DC/DC converters. In an example embodiment, an electrical property change on one side of an optically isolated DC/DC converter might be detected using the disclosed methods on the other side of it by creating the mentioned sample loads. The sensor(s) may be of the type disclosed in U.S. Patent Application Publication No. 2015/0137864, entitled "Circuit Delay Monitoring Apparatus and Method," assigned to the Assignee of the present application, the content of which is incorporated herein in its entirety. This sensor, which goes by the product name "VSurge" utilizes a digital sampling oscilloscope that measures the sensor's own power supply rail, and includes triggering circuitry to generate an event when the rail droops below a programmable threshold. A signal generator for generating on-chip loads as a signal generator for power supply noise is represented by block 404. Advantageously, dynamic-responses might be coordinated to occur at multiple points on the board or chip—either coordinated or uncoordinated. Such excitation may occur at multiple points, optionally time-diverse, to generate more complex patterns in accordance with embodiments of the present disclosure.

These multiple points are conceptually and generally represented by reference numerals $401_1, 401_2, \ldots 401_N$. As will be appreciated, the term "dynamic response" is generally construed as the response of a system to a dynamic (i.e. time varying) event. Thus, a dynamic response is intended to include an impulse response (time-domain response to an impulse function input; or its frequency-domain equivalent), a step response (same, but to a step function input), peak resonant frequency, top-N resonant peaks, frequency response, and the like. As will be appreciated, such measurements can be transformed using conventional signal processing techniques, e.g. a Fourier transform.

As shown in FIG. 4, the on-chip power supply noise sensor $402_1$ and loads quantify the impedance and frequency response of the power delivery network (off chip and on chip regulators, decoupling capacitances, parasitics, etc.), and this measurement is utilized to detect changes in the response due to additions or removals of elements in the network (such as a removal of a decoupling capacitor, or additional inductance due to patching a probe wire onto the PCB trace). A processor generally represented by block 406 is employed to implement the functionality of the disclosure as described in further detail below. The processor 406 is operably coupled to the one or more or more sensors ($402_1$, $402_2 \ldots 402_N$) and secure memory 408. The architecture disclosed herein can be implemented as a hardware and software co-design or as a fully embedded on-chip hardware block. Additional software can be provided to drive the sensors ($402_1, 402_2 \ldots 402_N$) for a set of security applications in accordance with embodiment of the disclosure. Compared to the logic nets and gates of system on chips (SoCs), which are referred to herein as points of interest, the sensors themselves have inconsequentially small performance, power and area (PPA) impact and therefore, the software can run on a low power processor or a dedicated hardware block can be used that implements these services.

In general, a method in accordance with an embodiment of the disclosure generally consists of three phases: characterization, protection and reaction. During characterization, the response of the points of interest is characterized. During this phase, stress-tests stimuli are applied (e.g. instruction sequences result in a large change in current consumption, such as a mis-predicted branch for a CPU core intellectual property (IP) block), and the sensor(s) ($402_1, 402_2 \ldots 402_N$) are used to measure how the PDN 100 responds to this impulse. The (complex) frequency response of the power delivery network provides a measurement indication of the power network impedance (S-parameters). In addition to stress-tests stimuli, complex stimuli can be used to generate arbitrary signals or waveforms, such as AC coupled onto the SoC power supply rail(s) that can speed up the characterization phase. Another option is to use design-specific custom stimuli, and measuring the responses from the points of interest, which allows for a faster responses characterization. Optionally, custom hardware, can be integrated together with the sensor, and could be used to generate stimuli for a faster points of interest characterization. The characteristics of the points of interest are stored as golden reference characteristics in the secure memory 408. In addition to the characteristics, attacks can also be emulated and the deviation of the responses of the points of interest can be stored for diagnostic purposes. The characterization phase can also be executed online to store historical responses. This is represented generally by a server 414 coupled to a communications network 416. At a high-level, the server 414 includes at least one processor 410 and memory 412 for storing the historical responses. In this manner, two functionalities are enabled. First, the type of attack to be protected against can be emulated, and the responses of the points of interest collected. This enables the collection of the attack-response characterization. Second, the points of interest in the system can be continuously placed under response-monitoring, and the responses can be compared with stored reference responses that belong to systems that are under attack in order to diagnose the type of the attack. It will be appreciated also that quantities of operating conditions such as the temperature, humidity, moisture through condensation, ageing etc., which can be provided by other sensors and predictive models, can be used to cluster the responses from points of interest to enhance their accuracy. Furthermore, the characteristics of a power distribution network are affected by the location of the points of interest that are observed. Therefore, multiple responses can be stored as golden references from multiple locations, and this can be used for enhancing further the diagnosis ability of the type of threat/attack that is detected.

During the protection phase, the system applies, continuously and/or periodically, the characterization phase to collect responses (dynamic response properties) from the sensors ($402_1, 402_2 \ldots 402_N$) that monitor the points of interest based on which the system response is formed. Deviation between the system response from the golden reference system response, is used to detect possible threats and/or attacks that are imminent and/or are taking place on the protected hardware. Diagnosis of the threat can then take place to identify the type of threat (disordering, etc.) and its location. The first can be implemented by using the stored dynamic-responses from emulated threats, or from threats that have already been diagnosed by other protection-systems, and the latter using the location of points of interest. Another option for diagnosis of the threat's location, is the deviation of the PDN impedance compared to the golden reference. First-, second- and third-order resonance deviation, as described above and illustrated in FIG. 3, provides an indication that the attack took place at the die, the package or the PCB respectively. The protection phase can occur continuously, measuring the points-of-interest characteristics in real-time. The comparison with the golden references can be implemented either in software executing on the low power processor (the same that was used for characterization) and/or dedicated hardware operable for this purpose (collectively represented by block 406). The protection phase can be executed once during boot, and/or continuously or periodically at run-time.

In accordance with the present disclosure, embodiments thereof prevent an attacker from predicting scheduled pulses and measurements and easily evading detection. In this regard, it will be appreciated that by aggregating many data-windows at random or pseudorandom time offsets, it is possible to cancel out non-predictable background system behavior (systematic or non-systematic). Such randomness thus decouples any sampling from regularities in power consumption of the system. The system power consumption typically has a much stronger signal than the much weaker response to the programmable applied load. By aggregating 100-thousands of time-series windows (each with, for example, a 10 k sample time series), it is possible to cancel out system operation noise, and to emphasize the dynamic-response signal(s) for further analysis.

In a first example (Simple Power Analysis Case), the measurements are scheduled at a time where the power consumption pattern is fully understood. This can be either during known power load profiles of certain instructions, using either the load pattern of the instruction, or by adding additional loads using load circuits. In many cases such measurement can be performed in idle processor states of the CPU (optionally suspending unpredictable chip functions during the measurements). A single measurement time series window or a few measurement windows aggregated can already result in useful response patterns at low noise in this case. In a second example (Differential Power Analysis Case), the power measurements/load generations are ideally scheduled at random intervals, but in fixed time relation between pulse-start and sampling-start. This allows summing up all the individual samples of multiple windows for the same time Delta t/array index respective from the start of sampling. This results in aggregation that averages out random influences with respect to this sample, and emphasizes the signal of interest—the weak dynamic-response hidden within the strong system operation noise. Over 100-thousands of iterations of aggregation of time series sample windows, that signal becomes much stronger than the noise associated with system operation and it can be used to ascertain changes in system response. By doing more aggregations or by increasing the load strength for the test load on the power delivery network, the time and iterations required for capturing the signal of interest, the impulse response, can be controlled. Depending on the current trust level of the system, the test load strength or the time between running a new time series sample-sequence can be modified. This allows the system to decrease the time needed to accurately measure the system response at expense of power consumption and visibility to potential attackers.

Figure 5:
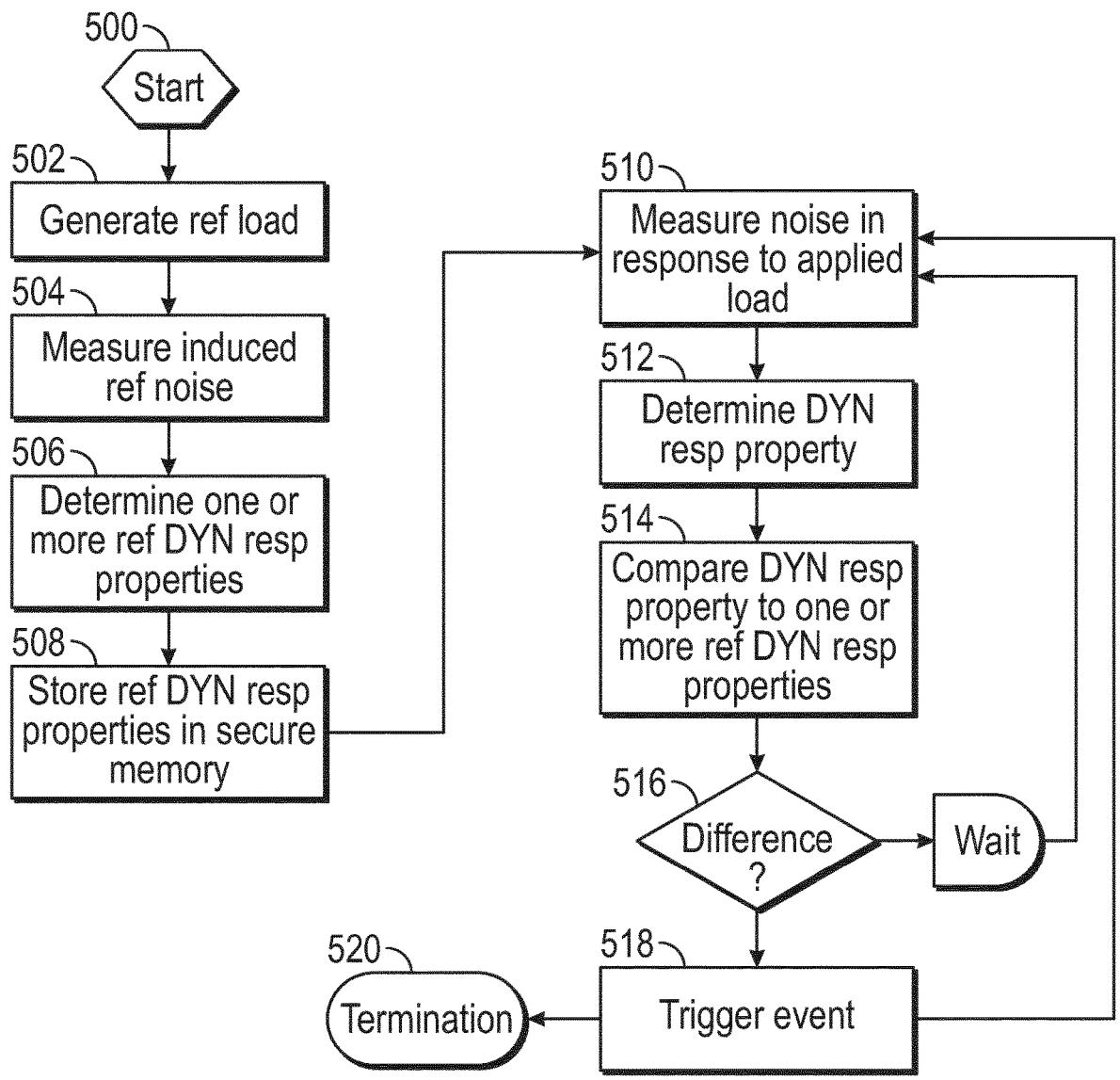
FIG. 5 is a flow diagram of a method for detecting a change in electrical properties in a system powered by a PDN in accordance with an embodiment of the present disclosure.

Referring to FIG. 5, there is illustrated a flow diagram of a method for detecting a change in electrical properties in a system powered at least in part, by a power delivery network (PDN 100). The method starts at block 500 and proceeds to block 502, where a reference load is generated on the power delivery network in the collection phase. The reference load is generated, for example, by the signal generator 404 as described above. As described above, the test load strength or time between running a new time-series sample sequence can be modified. At block 504, a reference noise induced in the PDN 100 is measured, using one or more sensors ($402_1$, $402_2 \ldots 402_N$) located on the PDN 100, in response to the reference load. At block 506, one or more dynamic-response properties are determined based on the measured reference noise by the processor 406. At block 508, the processor stores the one or more reference dynamic-response properties in secure memory 408. Such reference dynamic-response property(ies) (the golden reference(s)) are used to determine the presence of attacks. In the protection phase, at block 510, using the sensors located on the PDN 100, noise induced in the power delivery network is measured in response to an applied load. Based on this measured noise, at block 512 a dynamic response property of the PDN 100 is determined in response to the applied load. At block 514, the processor 406 compares the dynamic-response property of the PDN 100 to the stored one or more reference dynamic-response properties of the PDN 100. At block 516, if there is a difference between the dynamic-response property and one or more reference dynamic-response properties stored in the secure memory 408, then at block 518 system triggers a response to the event. The protection phase may proceed continuously, in which case the process loops from blocks 516 and 518 back to block 510. Otherwise, after an event triggered at block 518, the process terminates at block 520.

Figure 6:
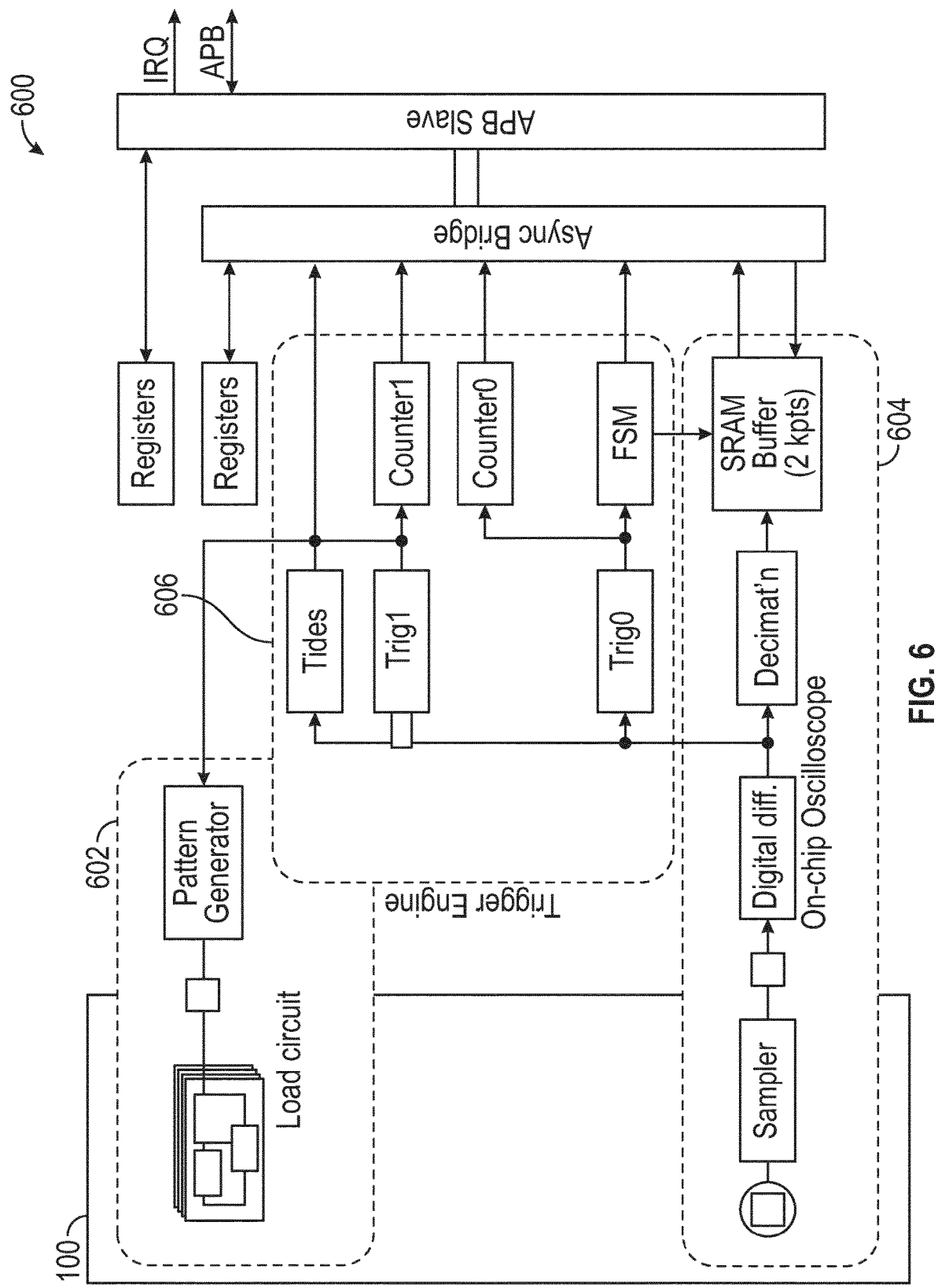
FIG. 6 is a high-level schematic of an apparatus for implementing embodiments of the present disclosure.

Referring now to FIG. 6, there is depicted a high-level schematic of an apparatus 600 for implementing embodiments of the present disclosure. The characteristics of the points of interest used can be the power rail voltage time-domain, current rate of change di/dt, the number of sensor triggers count and the frequency domain of their respective impedance. A load circuit is characterized generally by the reference numeral 602. A trigger type of sensor instructs an on-chip oscilloscope 604 whether or not to wait for a trigger condition, and how to handle the arrival of such trigger. A trigger engine 606 of the oscilloscope consists of blocks that are configured to provide flexibility on triggering the sensor, similar to an external oscilloscope. Auto-triggers, event counters and time stamp blocks also allow points of interest to be monitored, timed and counted. These quantities are sensitive to the workload executed and the electrical characteristics of the power delivery network, and are described in detail in P. N. Whatmough, S. Das, Z. Hadjilambrou, and D. M. Bull, "Power integrity analysis of a 28 nm dual-core arm cortex-a57 cluster using an all-digital power delivery monitor," IEEE Journal of Solid-State Circuits, vol. 52, no. 6, June 2017, and the publication "Modeling and characterization of the system-level power delivery network for a dual-core arm cortex-a57 cluster in 28 nm cmos," described above. For the responses, statistically significant data from long stimuli sequences are used, therefore threats from attacks that cause systematic deviation of the responses can be separated by insignificant events that cause random deviation of the responses compared to the golden references. For example, attaching an oscilloscope probe to a package pin could produce a systematic change in network response due to the addition of parasitics (inductances/capacitances) or stubs to the network, or by changing the loading on the line and causing response changes due to significant nonlinearities in components (such as ceramic capacitors) in the network. The configuration illustrated in FIG. 6 can be modified to implement the Differential Power Analysis Case described above by, instead of replacing samples in the SRAM buffer, the Decimation output is added to each point (index). By having a wider register for each point (i.e., 32 bits or more), many samples can be aggregated for processing. The resulting SRAM buffer would have eliminated the system power noise as long as the triggers for the sample start are scheduled randomly.

The reaction phase in accordance with the disclosure is triggered when a threat has been detected. The reactions can be different depending on the configuration of the system and the type of threat: e.g. locking down the system, reducing its "trust score" (locally and/or to a cloud management server), avoiding performing any sensitive operations (such as cryptographic operations) until the response returned to expected values, or in other ways as appropriate to the end application of the SoC. The reaction phase can be implemented by software, but for more secure applications is preferably implemented as a hardware design.

Figure 7:
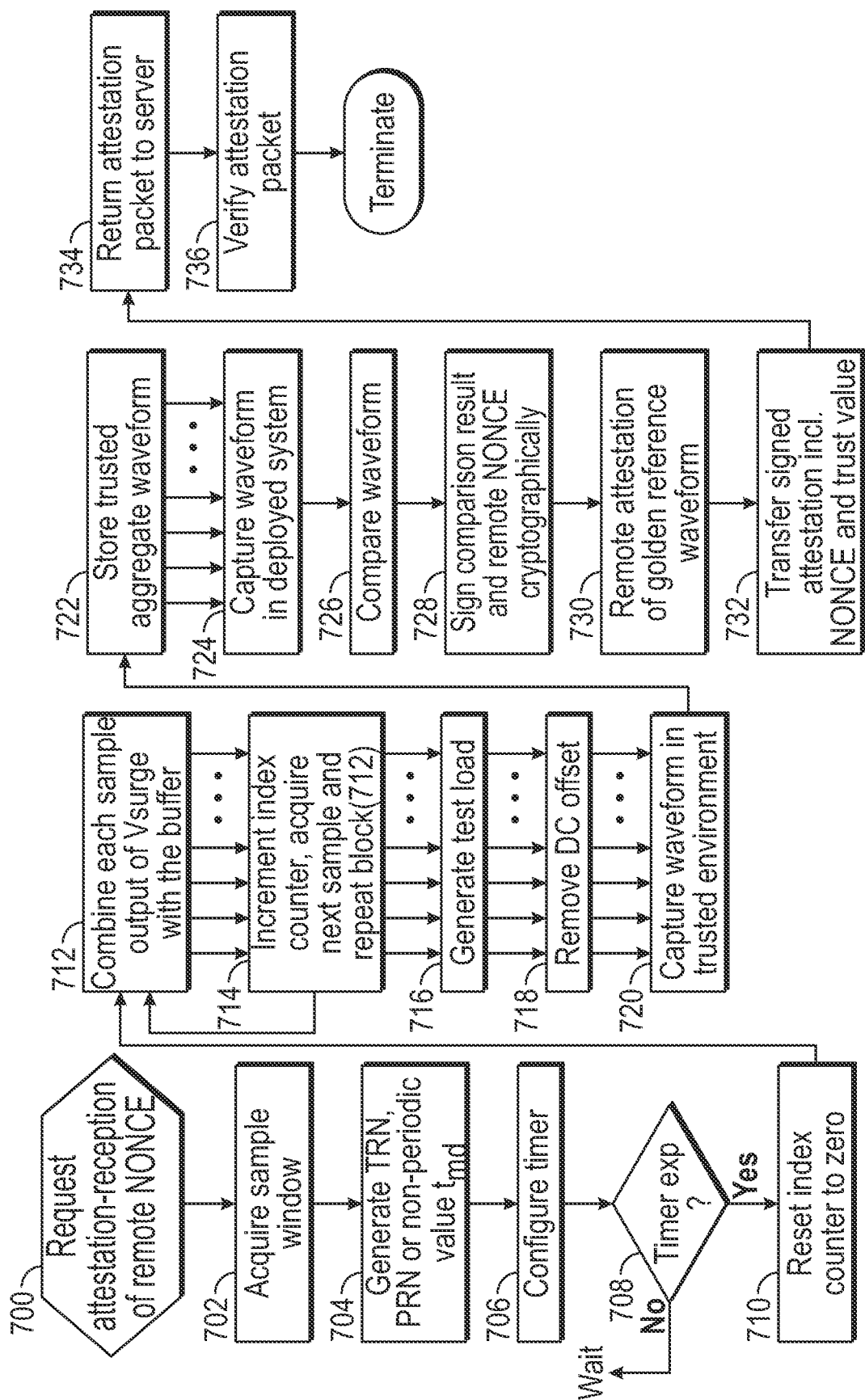
FIG. 7 is a flow diagram of a remote attestation method in accordance with an embodiment of the present disclosure.
Figure 8:
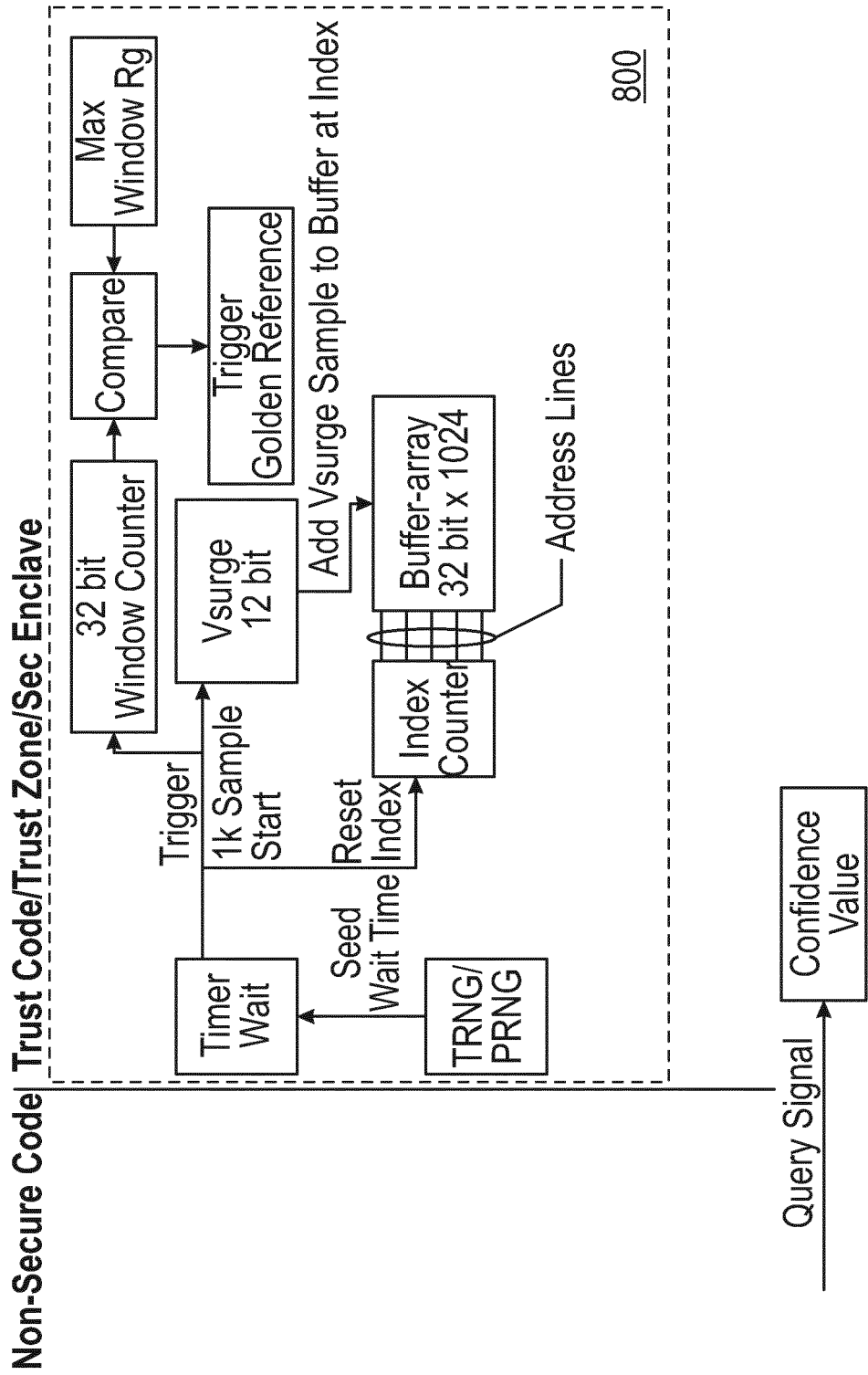
FIG. 8 is block diagram of a decimation step in accordance with an embodiment of the present disclosure.
Figure 9:
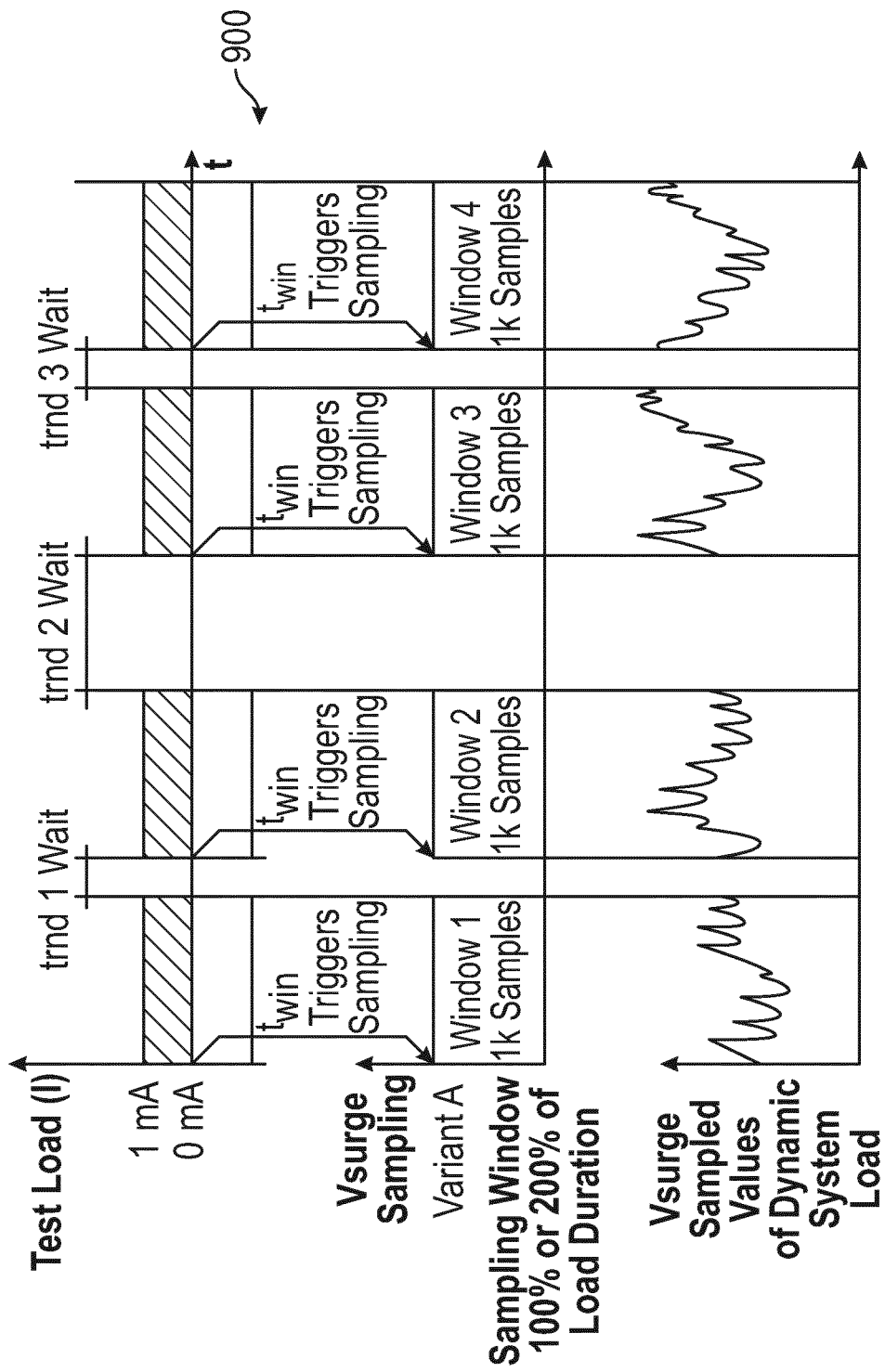
FIG. 9 is a timing diagram of a test load, sampling window, and sampled values of dynamic system load, respectively, in accordance with the attestation method of an embodiment of the present disclosure.

In accordance with an embodiment of the disclosure as illustrated in FIGS. 7-9, there is provided a methodology for deriving secure unique identification or attestation information from dynamic response of the power delivery network of an SoC to power demand stimuli as described above. This embodiment utilizes a power rail noise monitoring sensor and the approach described above, wherein the dynamic response (impulse response, complex impedance, S-parameters etc) of the power delivery network of an SoC and PCB level system is characterised/estimated. It will be appreciated by those skilled in the art, that ADC sensors as used in microcontrollers where the power supply voltage can be routed to the ADC and compared against an internal bandgap, allow absolute sampling of the supply voltage. Load can be generated either with switchable load resistors on the SoC or the existing switchable load resistors as used on GPIO pins that can be driven against power or signal rails. Alternatively, output GPIO pins can be directly driven against GND, Signal or Supply rails (power limited by the driving circuit) to generate momentarily high load. Embodiments of the disclosure ensure that the voltage rails sensors are only accessible to a privileged security level, which, among others, prevents side channel attacks from within. A programmable on-chip load, and phase-aligning that load with the start of a short sampling window of one or more sensors on power rails enables the system to capture 10's of thousands or millions of windows. These windows are all over the place and randomly distributed (unpredictable to potential attackers). This ensures that system level power deviations cancel each other out over time when averaging these windows. At the same time, embodiments of the disclosure emphasize the effects of minute differences resulting from the step response to the programmable load that is a constant distance to the sampling window.

From the above, a frequency response of the system that is affected by minute differences in the system PCB can be obtained. Such a fingerprint can be obtained during production while the system is regarded to be secure. Optionally, a discrete Fourier transform (DFT) may be performed on the one aggregated window (high resolution) to identify the frequency/phase response.

The known-good fingerprint is then stored into a secure memory controlled by the trusted code (Trustlet, v8M uVisor compartment etc.)

The secure fingerprint is continuously compared against the system state.

The windows can be either aggregated in blocks or continuously in a sliding window of windows. This creates a lowpass function that establishes a baseline removing noise generated by system activity.

The stored reference can be continuously updated during lifetime of the PCB to compensate aging of components like capacitors.

The system is operable to detect step functions in changes to frequency and phase response by comparing the current response to the stored reference.

As the reference is stored in secure memory, detection of modification of the main PCB may be obtained even after the circuit was turned off for a brief or long period of time.

From a protocol level a secure attestation key or an identity key-ideally chip specific and optimally tied to the chip manufacturer through a certificate chain, is provided. Optionally the verification of frequency response patterns can be implemented via a cloud service. The system only needs to forward the signed frequency response (time series or frequency distribution).

In accordance with an embodiment of the disclosure, the interested party sends a NONCE to the attesting party. The trusted code performs the measurement or takes a reasonably fresh measurement and compares that to the stored reference. If the differences between both are within an acceptable threshold, the system proves integrity to the interested party by replying with "Yes, I can attest that my system is not compromised-here's my reply including your NONCE, signed by a chip identity/attestation key". The NONCE ensures that an attacker can't replay these attestations, proving freshness.

The generated attestation load that is averaged over many windows can be either a simple square wave or a complex load wave pattern at multiple spatially/temporally different points of the chip or the board. The pattern can be constant, per remote party or per board (inferred from their public identity, optionally encrypting the response with the requestors public key). This complicates attacks against the scheme as the load patterns are not transferrable across devices and require more complex countermeasures from the attacker.

Load orchestration can be implemented across chip boundaries by synchronizing multiple chips for generating loads on power rails not directly accessible to the measuring chip and/or measure local cause of remote load effects. The orchestration synchronizes sampling with load allowing to remove the normal system load from the measurements. Multiple reference characteristics can be stored for reflecting different behaviours for different load cases (chip/board components enabled, or power gated), different power supply cases, different discharge levels of batteries, changing battery impedance during discharge, different temperature levels or humidity levels. The system is operable to choose the appropriate for comparison at that point.

Known deviations might be parametrised over the model to interpolate changed distribution of the frequency response depending on battery impedance etc. This avoids storing multiple versions of the response.

In one embodiment, to avoid the requirement for a high-speed ADC, the load resistor window may alternatively be moved relative to a low speed ADC at high resolution. Through additional oversampling, the time resolution can be increased.

Embodiments of the disclosure can be employed to verify integrity of IO pins (both digital and analog) by performing ADC readings in parallel to IO operations. In this regard, a light load may be applied on the measured pins by using integrated pull-up/pull-down resistors (100 kOhm or higher impedance).

With reference now to the flow diagram of FIG. 7, the block diagram of FIG. 8, and the timing diagram of FIG. 9, there is depicted a method of remote attestation in hardware or software in accordance with embodiments of the disclosure. The method starts at block 700, with a request for attestation and receipt of a remote NONCE, and proceeds to block 702 where the system acquires one Sample Window (FN_GET_WINDOW).

In block 704, the system generates True Random Number Generator (TRNG), Pseudorandom Number Generator (PRNG) or non-periodic value $t_{md}$.

In block 706, the system configures the timer to wait for $t_{md}$ cycles—resulting in the $t_{mdWait}$ time.

In block 708, after expiration of the configured time period $t_{mdWait}$ the method proceeds to block 710 and starts the capture process of the power rail voltage—current sensor ("VSurge" component 800, FIG. 8) using the signal name VSURGE_SAMPLE_START. VSURGE_SAMPLE_START resets the index counter INDEX_COUNTER (FIG. 8) to zero, determining the currently active array index in the buffer VSURGE_SAMPLE_BUFFER. VSurge samples VSURGE_SAMPLE, a value with 12 bit resolution.

In block 712, each sample output of Vsurge (VSURGE_SAMPLE) is combined with the buffer by adding it to the current buffer value at the index INDEX_COUNTER: SAMPLE_BUFFER[INDEX_COUNTER]+=VSURGE_SAMPLE.

In block 714 INDEX COUNTER is incremented, the next VSURGE_SAMPLE is acquired, and the previous step (block 712) is repeated for all SAMPLE_BUFFER entries (1024 buffer entries in this case, each 32 bit size).

In block 716, at a fixed time relative to VSURGE_SAMPLE_START, the test load pattern is generated. The pattern can be as simple as, for example, "Increase System Load by 1 mA for 50% of the time of the sample window".

The duration of the load determines the frequency response. In a more complex scenario the test load pattern can be arbitrary complex (digital or analog waveform). It's important that the load pattern is identical for all aggregated windows and always at the same time-relative position to VSURGE_SAMPLE_START. This is illustrated in the timing diagrams 900 of FIG. 9.

An aggregation of multiple windows (FN_GET_WINDOW_AGGREGATED) is performed. By running FN_GET_WINDOW multiple times, VSURGE_SAMPLE values are aggregated time-relative to the sample load. Thanks to the non-periodic property of scheduling FN_GET_ WINDOW using VSURGE_SAMPLE_START, the system load becomes non-periodic/random related to the sample window start. This enables the sample to asymptotically approach a single shared value for each entry of the SAMPLE_BUFFER. As the impulse response of the system is expected to be similar across multiple sample windows, the effect of the impulse response becomes significant in the data over 10's of thousands of aggregated windows. An example calculation for 12 bit VSURGE_SAMPLEs—aggregated in 32 bit buffer registers allows $2^{32-12}=2^{20}=1048576$ windows to be aggregated before the aggregation buffer overflows. As this example calculation demonstrates, ~1M windows can be aggregated. At this oversampling factor it can be expected that the system activity to average out thanks to the random/non-periodic scheduling of the VSURGE_SAMPLE_START signal, and emphasizing the frequency response for the test load, thereby lifting it out of the noise of the system load. The system load in most cases is expected to be at 100× or more of the magnitude of the test load signal (i.e., up to 100 mA system load, varying between 0.001 mA and averaging around 10 mA—and a test load of 1 mA).

In block 718, the DC-Offset of the aggregated data is either removed in postprocessing and/or during aggregation to make better use of the buffer resolution. Removing the DC offset removes the effect of different averages of system load when comparing two waveforms collected under different load conditions.

The system then generates a golden reference waveform (i.e., trusted reference waveform) (FN_GET_WINDOW_AGGREGATED_REF). In block 720, the waveform FN_GET_WINDOW_AGGREGATED is captured in a trusted environment, preferably as the last step of a trusted manufacturing process.

In block 722, the waveform FN_GET_WINDOW_AGGREGATED is stored in a trusted storage (optionally signed to prevent tampering, and tied to the root of trust framework of the device).

The system then verifies the reference waveform, (FN_GET_WINDOW_AGGREGATED_ATTEST). In block 724, the waveform FN_GET_WINDOW_AGGREGATED is captured in the deployed system. Preferably all hardware and software responsible for the collection and performing the verification steps runs in a trusted environment like TrustZone, ARM Secure Island (available from the assignee of the present application) or a dedicated security processor. The peripherals like timers and VSurge should only be made accessible by the trusted domain to ensure untrusted code can't tamper with the acquisition data or logic.

In block 726, the waveform is then compared with the waveform captured FN_GET_WINDOW_AGGREGATED_REF (this comparison ideally happens in the trusted domain). Multiple golden references might be stored for different environmental conditions (temperature ranges, humidity levels, battery voltage levels, battery impedance depending on discharge levels etc.). The comparison is done to the golden reference matching made under environmental conditions that most closely match the current environmental conditions. Golden references for two adjacent environmental conditions can be optionally interpolated if needed to generate an even closer "virtual golden references". The golden reference and the measured waveform can be either directly compared (error square analysis etc.)—or analyzed for frequency bands and signal magnitudes using DFT or similar means. The stored reference would then be a set of frequency bands and related expected magnitudes of the signal in these bands depending on the length/frequency composition of the test load pattern. The analysis methods are described above. The result of the analysis is either a match/no-match output based on an internal threshold, or a confidence value relating the level of trust into the system being close to the golden reference.

In block 728, the result is then signed cryptographically (Public Key Signatures or HMAC using a shared secret)—optionally adding a trusted/secure time stamp, a sequence counter or a proof-of-freshness like a NONCE provided by the requesting party. All of the above processing is ideally protected by the trusted environment to prevent tampering with the logic or data, or signature secrets before or after the signatures are applied. The signing secrets are ideally protected against exfiltration.

Next, there is performed remote attestation of the reference waveform (FN_GET_WINDOW_AGGREGATED_REMOTE_ATTEST). In block 730, a remote cloud server system triggers locally the FN_GET_WINDOW_AGGREGATED_ATTEST mechanism, for example, by providing a server-generated random NONCE, that must be co-signed with the trust value calculated in the FN_GET_WINDOW_AGGREGATED_ATTEST step.

In block 732, the signed attestation including the NONCE and the trust value result is transferred to the non-secure side in case secure/non-secure separation exists.

In block 734, a fully untrusted network stack then returns the attestation packet to the cloud server.

In block 736, the server verifies whether the attestation packet is consistent with the expected device identity (either based on the shared HMAC secret or a valid certificate chain for the device attestation certificate that has been used for signing the trust value. If, at block 734 the trust value is determined to be high enough, or the binary indication confirms a match of the internal golden reference with the freshly captured and aggregated waveform, the server can then safely provision further secrets or confidential date(s) or code to the device. This method therefore enables reasoning of the extended board level integrity (tamper, attached parasite circuits, loggers etc.) from within an application processor die or microcontroller. This verification can be remotely attested cryptographically using the above steps—including proof of freshness.

Figures 10, 11:
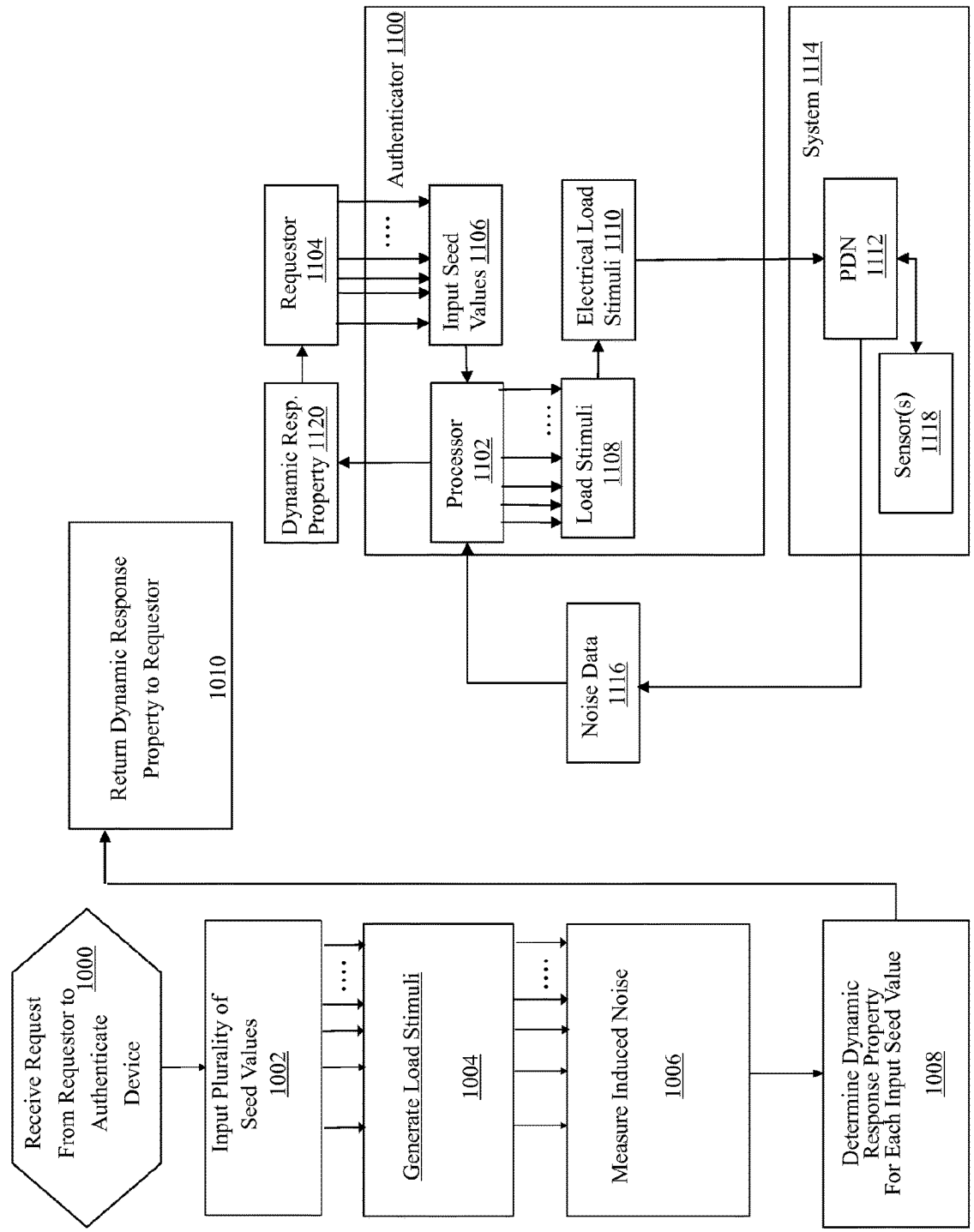
FIG. 10 is a flow diagram for authenticating a device in a system using electrical properties in the system in accordance with a method of an embodiment of the present disclosure.
FIG. 11 is a high-level block diagram of an authenticator in accordance with an embodiment of the present disclosure.

Referring now to FIG. 10, there is illustrated a flow diagram of a method for authenticating a device in a system using electrical properties in the system.

In block 1000 the method starts with a request to authenticate the device.

In block 1002, a plurality of input seed values are received from a requestor. The seed values enable the initialization sequence for each load stimuli. In this connection, there is provided a causal relationship between an input load seed values and the load stimulus such that both the authenticator/requestor and authenticatee jointly know the mapping of seeds to load stimuli. In one embodiment, a defined function may be utilized, taking one or more seeds as input and returning one or more stimuli as output. In other embodiments, it may be parameterizable based on a shared secret (e.g. as an additional input to the defined function). In yet other embodiments, the nature of the stimuli can be configured in the form of a variable current load enabled by explicit load circuitry. Alternatively, the stimulus can also be provided by execution of sequence of instructions.

In block 1004; for each input seed value, load stimuli are generated to produce an electrical load sequence on a power delivery network (see above) powering at least part of the system. Each electrical load sequence relates to at least one magnitude and phase component in a specific frequency band corresponding to a dynamic response of the system.

In block 1006, noise induced in the power delivery network in response to the electrical load sequence is measured, using one or more sensors located on the power delivery network.

In block 1008, based on the measured noise, a dynamic response property of the power delivery network corresponding to a respective input seed value is determined.

In block 1010, the dynamic response property of the power delivery network is returned to the requestor.

The input seed value can be modified by a secret known only to the device to ensure that an attacker cannot predict the load sequence from the input seed value. Further, the input seed value can be modified by a secret shared between the requestor and the device. The shared secret compensates for aging of components of the device by modifying a threshold applied by the requestor in the authentication. Advantageously and as discussed above, the dynamic response property is stored in a secure memory as a set of reference parameters. The device may be authenticated using a shared HMAC secret or a valid certificate chain.

Referring now to FIG. 11, there is depicted a high-level block diagram of an example authenticator 1100 in accordance with an embodiment of the present disclosure. The authenticator 1100 may be embodied in hardware, software or a combination thereof. In an example embodiment, authenticator 1100 includes a processor 1102 operable to receive, from a requestor 1104 (i.e., an electronic device configured to communicate with the authenticator over a hardwired, wireless and/or networked connection), a plurality of input seed values 1106 and generate, for each input seed value 1106, load stimuli 1108 for generating an electrical load sequence 1110 on a power delivery network 1112 powering at least part of a system 1114. Each electrical load sequence relates to at least one magnitude and phase component in a specific frequency band corresponding to a dynamic response of the system 1114. The processor 1102 is further operable to receive data representing noise 1116 induced in the power delivery network 1112 in response to the electrical load sequence 1110 measured using one or more sensors 1118 located on the power delivery network 1112. The processor 102 determines, based on the measured noise, a dynamic response property 1120 of the power delivery network 1112 corresponding to a respective input seed value, and returns the dynamic response property 1120 of the power delivery network 1112 to the requestor 1104.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following numbered items:

1. A method for authenticating a device in a system using electrical properties in the system, the method including: receiving, from a requestor, a plurality of input seed values; generating, for each input seed value, load stimuli to generate an electrical load sequence on a power delivery network powering at least part of the system, each electrical load sequence relating to at least one magnitude and phase component in a specific frequency band corresponding to a dynamic response of the system; measuring, using one or more sensors located on the power delivery network, noise induced in the power delivery network in response to the electrical load sequence; determining, based on the measured noise, a dynamic response property of the power delivery network corresponding to a respective input seed value; generating, from the dynamic response property of the power delivery network a plurality of authentication response values, each authentication response value relating to at least one magnitude and phase component in a specific frequency band corresponding to the measured dynamic response property; returning the authentication response values to the requestor; and at the requestor, comparing the authentication response values to known authentication response values to authenticate the device.

2. The method of item 1, where the system is stimulated by the electrical load sequence and the response measured at pseudo-random time intervals.

3. The method of items 1 or 2, where the input seed value is modified by a secret known only to the device.

4. The method of any of items 1 to 3, where the input seed value is modified by a secret shared between the requestor and the device.

5. The method of item 4, where the shared secret compensates for aging of components of the device by modifying one or more thresholds applied by the requestor.

6. The method of any of items 1 to 5, where the dynamic response property is stored in a secure memory as a set of reference parameters.

7. The method of any of items 1 to 6, further including authenticating the device by combining the dynamic response authentication with a cryptographic authentication using certificates, pre-shared keys, or public/private key pairs.

8. An authenticator for authenticating a device in a system using electrical properties in the system, the authenticator including: a processor operable to: receive, from a requestor, a plurality of input seed values; generate, for each input seed value, load stimuli for generating an electrical load sequence on a power delivery network powering at least part of the system, each electrical load sequence relating to at least one magnitude and phase component in a specific frequency band corresponding to a dynamic response of the system; receive data representing noise induced in the power delivery network in response to the electrical load sequence measured using one or more sensors located on the power delivery network; determine, based on the measured noise, a dynamic response property of the power delivery network corresponding to a respective input seed value; generate, from the dynamic response property of the power delivery network a plurality of authentication response values, each authentication response value relating to at least one magnitude and phase component in a specific frequency band corresponding to the measured dynamic response property; and return the dynamic response property of the power delivery network to the requestor, the requestor operable to compare the authentication response values to known authentication response values to authenticate the device.

9. The authenticator of item 8, where the system is stimulated by the electrical load sequence and the response measured at pseudo-random time intervals.

10. The authenticator of items 8 or 9, where the input seed value is modified by a secret known only to the device.

11. The authenticator of any of items 8 to 10, where the input seed value is modified by a secret shared between the requestor and the device.

12. The authenticator of item 11, where the shared secret compensates for aging of components of the device by modifying one or more thresholds applied by the requestor.

13. The authenticator of any of items 8 to 12, further including a secure memory, where the dynamic response property is stored in the secure memory as a set of reference parameters.

14. The authenticator of any of items 8 to 13, further comprising authenticating the device by combining the dynamic response authentication with a cryptographic authentication using certificates, pre-shared keys, or public/private key pairs.

In accordance with the foregoing, a novel apparatus and method for authenticating a device in a system using electrical properties in the system is disclosed. Having thus described the present disclosure in detail and by reference to embodiments thereof, it will be apparent that modifications and variations are possible without departing from the scope of the present disclosure defined in the appended claims as follows:

The invention claimed is:

1. A method for authenticating a device in a system using electrical properties in the system, the method comprising:
   receiving, from a requestor, a plurality of input seed values;
   generating, for each input seed value of the plurality of input seed values, load stimuli to generate an electrical load sequence on a power delivery network powering at least part of the system, the electrical load sequence relating to at least one magnitude and phase component in a specific frequency band corresponding to a dynamic response of the system;
   measuring, using one or more sensors located on the power delivery network, noise induced in the power delivery network in response to the electrical load sequence;
   determining, based on the measured noise, a dynamic response property of the power delivery network corresponding to the each input seed value;
   generating, from the dynamic response property of the power delivery network a plurality of authentication response values, each authentication response value of the plurality of authentication response values relating to the at least one magnitude and the phase component in the specific frequency band corresponding to the determined dynamic response property;
   returning the authentication response values to the requestor; and
   at the requestor, comparing the authentication response values to expected authentication response values to authenticate the device.

2. The method of claim 1, where the system is stimulated by the electrical load sequence and the response to the electrical load sequence measured at pseudo-random time intervals.

3. The method of claim 1, where the each input seed value is modified by a secret known only to the device.

4. The method of claim 1, where the each input seed value is modified by a secret shared between the requestor and the device.

5. The method of claim 4, where the shared secret compensates for aging of components of the device by modifying one or more thresholds applied by the requestor.

6. The method of claim 1, where the dynamic response property is stored in a secure memory as a set of reference parameters.

7. The method of claim 1, further comprising authenticating the device by combining a dynamic response authentication with a cryptographic authentication using certificates, pre-shared keys, or public/private key pairs.

8. An authenticator for authenticating a device in a system using electrical properties in the system, the authenticator comprising:
   a hardware processor operable to:
      receive, from a requestor, a plurality of input seed values;
      generate, for each input seed value the plurality of input seed values, load stimuli for generating an electrical load sequence on a power delivery network powering at least part of the system, the electrical load sequence relating to at least one magnitude and phase component in a specific frequency band corresponding to a dynamic response of the system;
      receive data representing noise induced in the power delivery network in response to the electrical load sequence measured using one or more sensors located on the power delivery network;
      determine, based on the measured noise, a dynamic response property of the power delivery network corresponding to the each input seed value;
      generate, from the dynamic response property of the power delivery network a plurality of authentication response values, each authentication response value of the plurality of authentication response values relating to the at least one magnitude and the phase component in the specific frequency band corresponding to the determined dynamic response property; and
      return the dynamic response property of the power delivery network to the requestor, the requestor operable to compare the authentication response values to known authentication response values to authenticate the device.

9. The authenticator of claim 8, where the system is stimulated by the electrical load sequence and the response to the electrical load sequence measured at pseudo-random time intervals.

10. The authenticator of claim 8, where the each input seed value is modified by a secret known only to the device.

11. The authenticator of claim 8, where the each input seed value is modified by a secret shared between the requestor and the device.

12. The authenticator of claim 11, where the shared secret compensates for aging of components of the device by modifying one or more thresholds applied by the requestor.

13. The authenticator of claim 8, further comprising a secure memory, where the dynamic response property is stored in the secure memory as a set of reference parameters.

14. The authenticator of claim 8, further comprising authenticating the device by combining a dynamic response authentication with a cryptographic authentication using certificates, pre-shared keys, or public/private key pairs.

* * * * *